Oct. 11, 1949.    S. G. FUSTON    2,484,280
WHEEL SUSPENSION FOR VEHICLES
Filed March 22, 1948
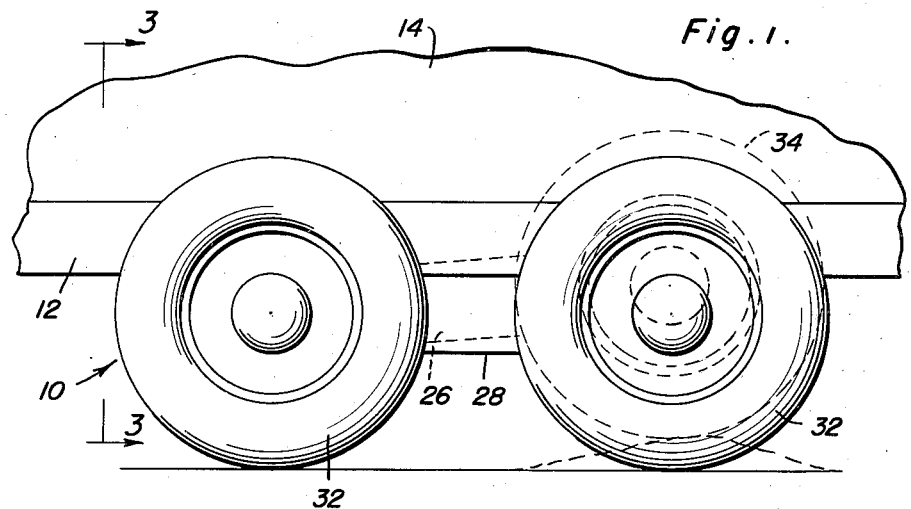
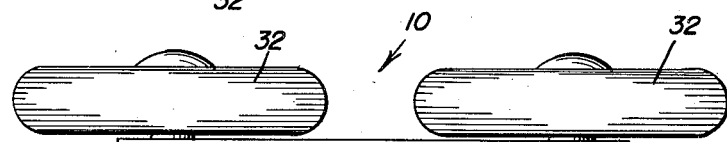
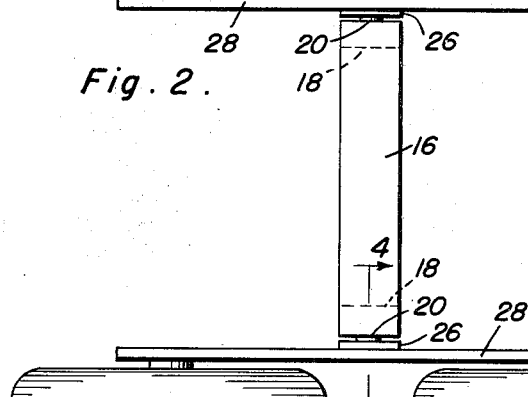
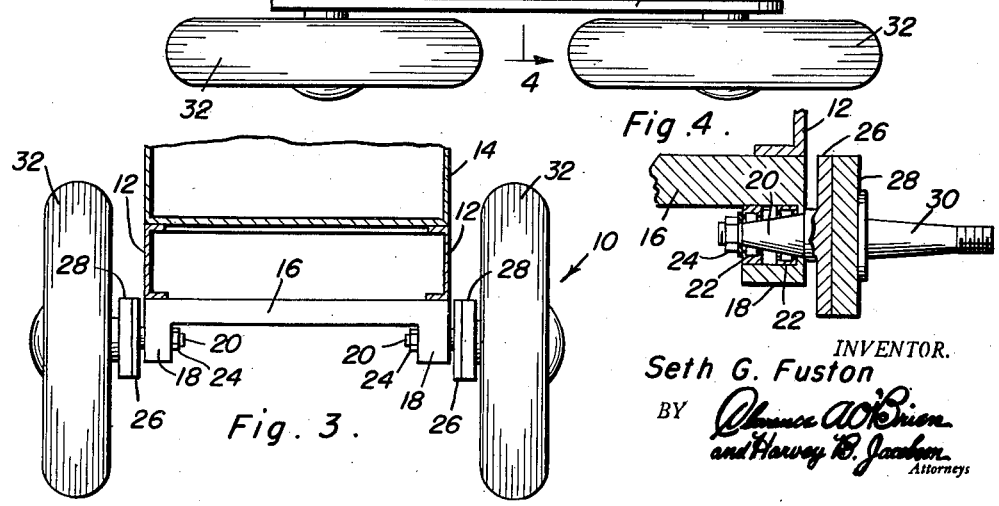
INVENTOR.
Seth G. Fuston Patented Oct. 11, 1949

2,484,280

UNITED STATES PATENT OFFICE 2,484,280

WHEEL SUSPENSION FOR VEHICLES

Seth G. Fuston, Turkey, Tex.

Application March 22, 1948, Serial No. 16,195

1 Claim. (Cl. 280—104.5)

This invention relates to new and useful improvements and structural refinements in wheel suspension for vehicles, such as for example, trucks, trailers, buses, and the like, and the principal object of the invention is to facilitate rising and falling movement of the wheels in compensation for irregularities of the ground, without severely jarring the vehicle itself.

This object is accomplished by suspending several wheels on axles mounted upon equalizing beams which, in turn, are pivoted to the frame of the vehicle, the equalizing beams permitting the wheels to rise and fall individually, as dictated by the contour of the ground.

An important feature of the invention resides in the provision of wheel suspension which eliminates the use of conventional suspension springs.

Another feature of the invention resides in the provision of wheel suspension which is simple in construction, which will not easily become damaged, and which may be effectively employed in association with vehicles of various sizes and types.

With the above more important objects and features in view and such other objects and features as may become apparent as this specification proceeds, the invention consists essentially of the arrangement and construction of parts as illustrated in the accompanying drawings, in which:

Figure 1 is a side elevational view of the invention;

Figure 2 is a top plan view thereof with the vehicle body removed;

Figure 3 is a cross sectional view, taken substantially in the plane of the line 3—3 in Figure 1; and Figure 4 is a cross sectional view, taken substantially in the plane of the line 4—4 in Figure 2.

Like characters of reference are employed to designate like parts in the specification and throughout the several views.

Referring now to the accompanying drawings in detail, the invention consists of wheel suspension for vehicles designated generally by the reference character 10, the same being intended for use in association with any suitable vehicle including a pair of frame side members 12 carrying the vehicle body 14.

A rigid, transversely extending axle 16 is firmly secured to the frame member 12 and the end portions of the axle 16 are provided with downturned ears 18 to accommodate a pair of laterally projecting pivots 20 which are rotatably journaled in the ears by means of suitable anti-friction bearings 22.

Suitable keeper nuts 24 are provided on the pivots 20 for retaining the latter in position in the ears 18, the pivots 20 preferably being of a frusto-conical configuration and being provided at the outer ends thereof with flanged plates 26, as shown.

A pair of spaced parallel equalizing beams 28 have intermediate portions thereof rigidly secured by welding, or the like, to the flanged plates 26, the end portions of the beams 28 being equipped with laterally projecting stub-shafts 30 on which the road wheels 32 may be rotatably mounted.

It is to be noted that two of the wheels 32 are mounted on each of the beams 28, the wheels being transversely aligned in pairs, so that by virtue of the pivots 20 the wheels will be permitted to rise and fall individually in accordance with the contour of the ground over which they travel, as is indicated by the phantom lines 34.

The rising and falling of the wheels will not be transmitted to any great extent to cause jarring of the vehicle body (14) and it is to be noted by employing the equalizing beams 28 pivoted to the frame, as at 20, the conventional suspension springs are eliminated.

It is believed that the advantages and use of the invention will be clearly apparent from the foregoing disclosure, and accordingly, further description thereof at this point is deemed unnecessary.

Having described the invention, what is claimed as new is:

In combination with a vehicle including a frame, wheel suspension comprising a non-rotatable axle secured to the under side of said frame and provided at the ends thereof with a pair of depending ears, said ears being formed with axially aligned bores, an anti-frictioned bearing positioned in the bore of each ear, a pair of trunnions rotatably mounted in said bearings and projecting outwardly to the sides of said frame, mounting flanges formed integrally at the outer ends of said trunnions, a pair of spaced parallel equalizing beams each secured intermediate the ends thereof to one of said flanges, laterally projecting stub shafts provided on the end portions of said beams, and travelling wheels rotatably mounted on said stub shafts.

SETH G. FUSTON.

REFERENCES CITED

The following references are of record in the file of this patent:

UNITED STATES PATENTS

| Number | Name | Date |
|---|---|---|
| 1,924,536 | Judd | Sept. 5, 1933 |
| 1,950,175 | Hick | Mar. 6, 1934 |
| 2,204,108 | Townsend | June 11, 1940 |
| 2,260,574 | Martin | Oct. 28, 1941 |
| 2,288,246 | Kuester | June 30, 1942 |